(12) United States Patent
Tamamura

(10) Patent No.: US 6,384,942 B1
(45) Date of Patent: May 7, 2002

(54) IMAGE SCANNING UNIT

(75) Inventor: Katsuki Tamamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/258,145

(22) Filed: Feb. 26, 1999

(30) Foreign Application Priority Data

Feb. 27, 1998 (JP) .......................................... 10-064798

(51) Int. Cl.[7] .................................................. H04N 1/04
(52) U.S. Cl. ...................................... 358/475; 358/497
(58) Field of Search ................................ 358/475, 406, 358/474, 488, 497, 412, 409, 443, 448, 486, 451; 250/234; 382/298

(56) References Cited

U.S. PATENT DOCUMENTS

| | | | |
|---|---|---|---|
| 4,687,944 A | 8/1987 | Mitsuka et al. | 250/578 |
| 4,816,866 A | 3/1989 | Yamada | 355/14 R |
| 4,922,087 A | 5/1990 | Nakajima et al. | 250/201.4 |
| 6,219,463 B1 * | 4/2001 | Hyodo | 382/298 |

FOREIGN PATENT DOCUMENTS

| GB | 2 335 106 A | * | 9/1999 | |
|---|---|---|---|---|
| JP | 60-114082 | | 6/1985 | |
| JP | 62-172338 | | 7/1987 | |

* cited by examiner

Primary Examiner—Cheukfan Lee
(74) Attorney, Agent, or Firm—Foley & Lardner

(57) ABSTRACT

An image scanning unit for correcting a variation in magnification caused by an inclination of optical visual-line between a manuscript and a photoelectric conversion element when a full-speed scan reciprocating bed and a half-speed scan reciprocating bed are scanned in the sub-scan direction. The image scanning unit has: an optical system that leads light reflected on the manuscript to the photoelectric conversion element; a marking that is disposed on the optical visual-line of the full-speed scan reciprocating bed; a light source that supplies light to the marking; and a control circuit for accumulating marking information that is input through the optical system to the photoelectric conversion element and detecting an inclination of optical visual-line by comparing the accumulated marking information and regular marking information at regular optical visual-line, and for canceling the variation in magnification in the sub-scan direction caused by the detected inclination of optical visual-line.

6 Claims, 4 Drawing Sheets

IMAGE SCANNING UNIT

FIELD OF THE INVENTION

This invention relates to an image scanning unit that is used for a stationary-manuscript reading type of device such as a facsimile, a copying machine and a digital image inputting apparatus.

BACKGROUND OF THE INVENTION

FIG. 1 shows the basic composition of a conventional image scanning unit.

In FIG. 1, a full-speed scan reciprocating bed 2 is equipped with a light source 3 that supplies light to a manuscript laid on a glass template 1, and a mirror 4 that changes the optical path of its reflected light, and it moves under the glass template 1 to scan the manuscript length in the sub-scan direction. A half-speed scan reciprocating bed 7 is equipped with a pair of mirrors 5, 6 each of which changes 90° the optical path of light reflected on the mirror 4, and it moves synchronizing at the half speed of the full-speed scan reciprocating bed 2. Light reflected on the mirrors 5, 6 forms an image onto a photoelectric converting element (CCD) 9 through a lens 8, converted into an electrical signal. The electrical signal is then converted into the image information of manuscript through an image processing circuit (not shown).

The full-speed scan reciprocating bed 2 is coupled with a wire rope 10 at its balance position, and the half-speed scan reciprocating bed 7 is coupled through at least one pair of sheaves 11 with the wire rope 10 at its balance position. By moving the wire rope 10 being winded around a drum 12 through the rotation of the drum 12, the full-speed scan reciprocating bed 2 and half-speed scan reciprocating bed 7 move in reciprocation. The drum 12 is driven by a motor 15, through a shaft 13 and a transmission gear system 14.

In the image scanning unit shown in FIG. 1, the scan-speed ratio between the mirror 4 and the mirrors 5, 6 is theoretically 2:1, therefore the distance between the manuscript laid on the glass template 1 and the lens 8 is kept constant and the plane of image formed on the photoelectric converting element 9 is made constant regardless of the scan. However, due to the mechanical variation of drive system such as a diameter tolerance of the drum 12 and a line-diameter of the wire rope 10, or due to an inclination of optical visual-line occurring when the full-speed scan reciprocating bed 2 and half-speed scan reciprocating bed 7 are scanned, there occurs a variation in magnification in the sub-scan direction (direction of the manuscript length).

Of the factors to cause such a variation in magnification in the sub-scan direction, the mechanical variation of drive system can be suppressed by enhancing the precision of parts. On the other hand, the inclination of optical visual-line occurring when the full-speed scan reciprocating bed 2 and half-speed scan reciprocating bed 7 are scanned is very difficult to adjust, since it results from the optical positional relationships among the mirrors 4, 5 and 6, lens 8 and photoelectric converting element 9.

A conventional method employed is to adjust the speed of motor driven so as to cancel a variation in magnification according to the enlarging or reducing of recording image or scan data obtained by scanning a manuscript. However, this method requires to pre-detect the variation in magnification in the sub-scan direction in the image scanning unit, therefore incurring a problem that the number of steps increases.

Meanwhile, Japanese patent application laid-open No.62-172338 (1987) discloses a magnification-controlling copying machine that a reference-size pattern is received by an image sensor, comparing its output signal with a designated copying magnification, moving a zoom lens in such a direction that the error is minimized, thereby enhancing the precision of copying magnification. However, the correction of copying magnification by the movement of the zoom lens is only for the main-scan direction and is difficult to apply for the sub-scan direction.

Also, Japanese patent application laid-open No.60-114082 (1985) discloses an image processing unit that the magnifications in the main-scan and sub-scan directions can be independently controlled. However, the correction of magnification in the sub-scan direction is conducted by detecting the reference coordinates on the template at previous scan, then controlling the DC servomotor. Therefore, it is necessary to position the reference points in the wide range on the template.

SUMMARY OF THE INVENTION

Accordingly, it is an object of the invention to provide an image scanning unit that can automatically correct the enlarging and reducing of magnification in the sub-scan direction to occur in response to an inclination of optical visual-line during the scanning.

According to the invention, an image scanning unit for correcting a variation in magnification caused by an inclination of optical visual-line between a manuscript and a photoelectric conversion element when a full-speed scan reciprocating bed and a half-speed scan reciprocating bed are scanned in the sub-scan direction, comprises:

an optical system that leads light reflected on the manuscript to the photoelectric conversion element;

a marking that is disposed on the optical visual-line of the full-speed scan reciprocating bed;

a light source that supplies light to the marking;

means for accumulating marking information that is input through the optical system to the photoelectric conversion element and detecting an inclination of optical visual-line by comparing the accumulated marking information and regular marking information at regular optical visual-line; and means for canceling the variation in magnification in the sub-scan direction caused by the inclination of optical visual-line detected by the accumulating and detecting means.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
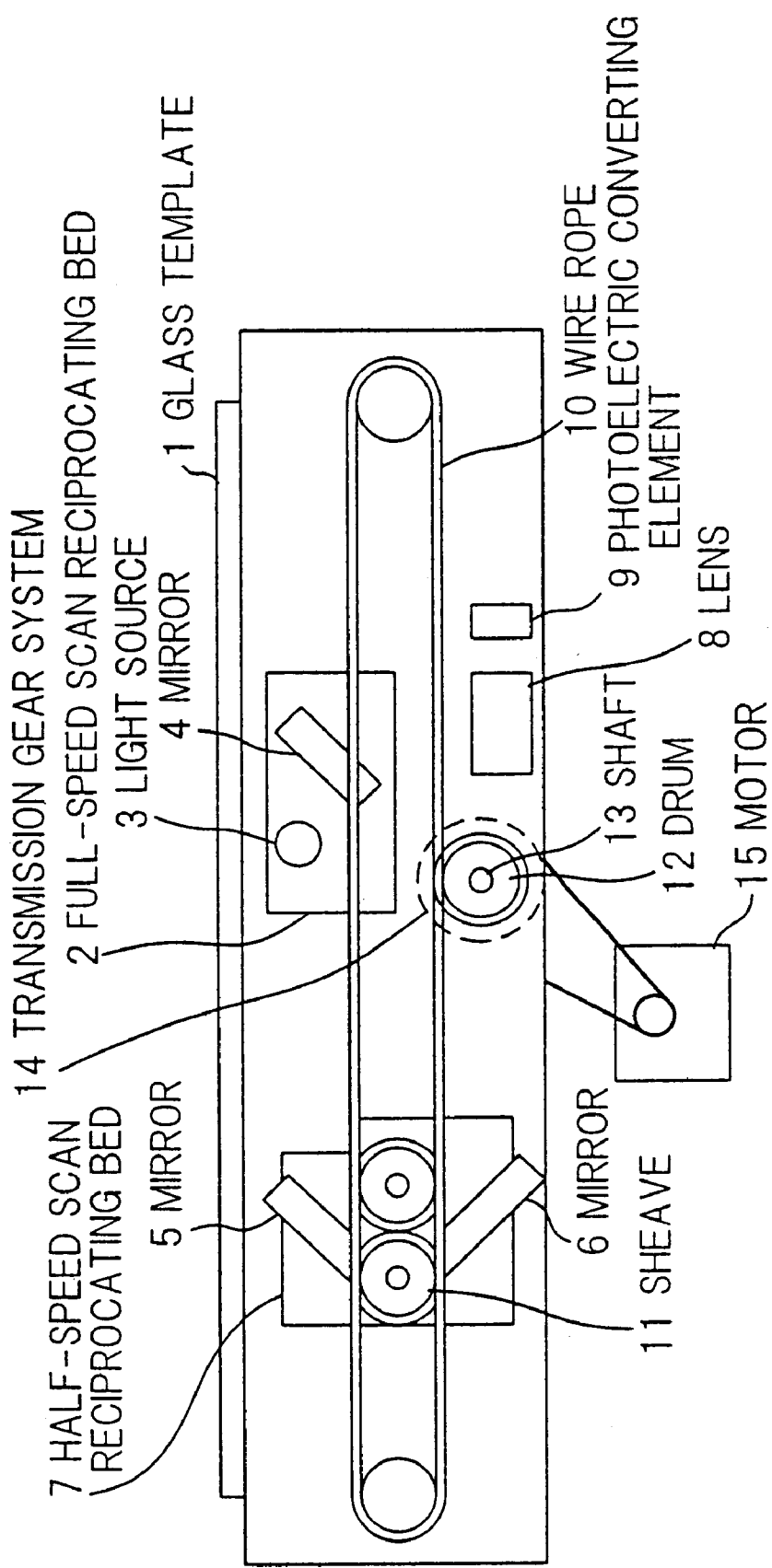
FIG. 1 is a front view showing the basic composition of a conventional image scanning unit.
Figure 2:
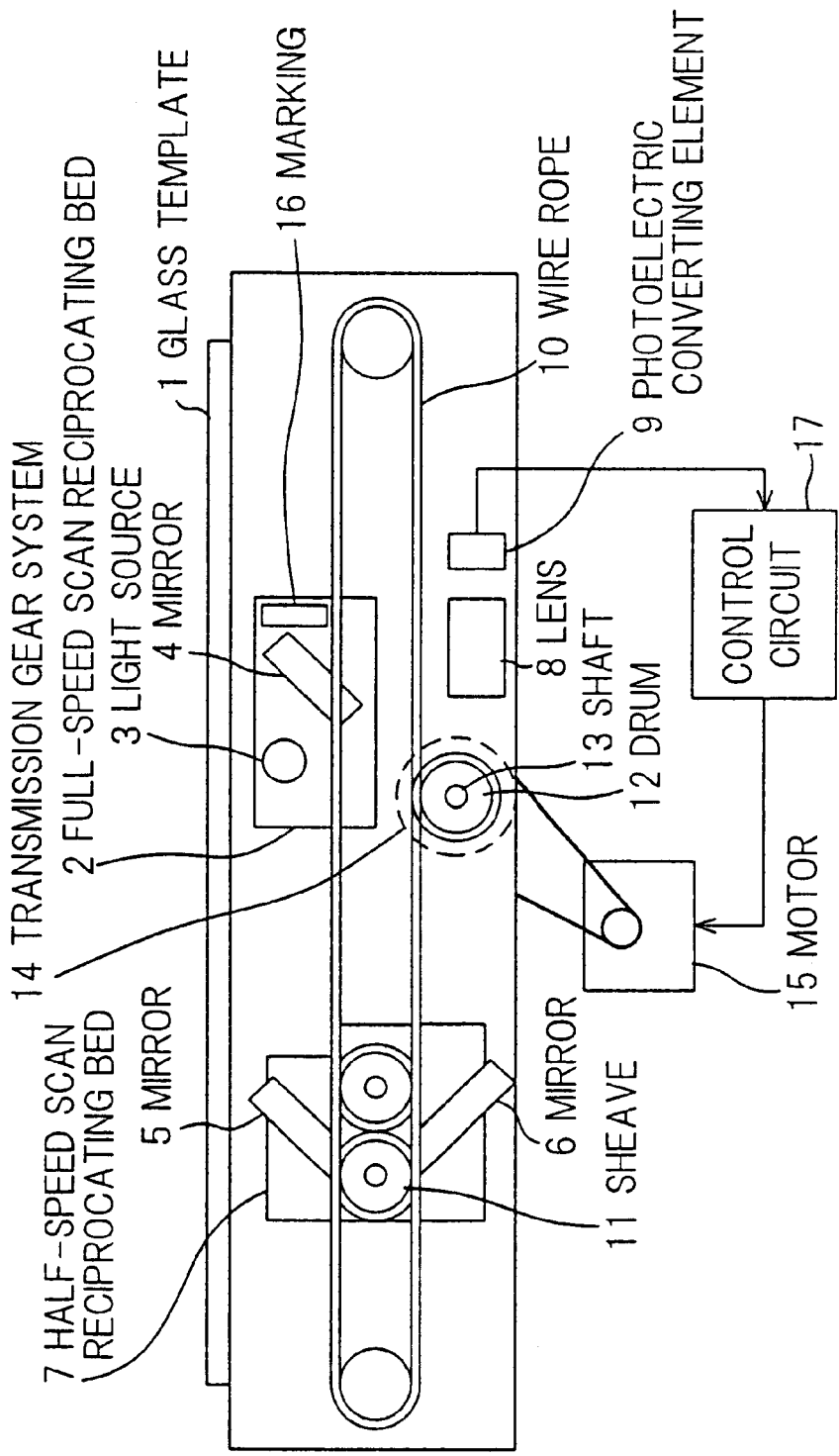
FIG. 2 is a front view showing an image scanning unit in a preferred embodiment according to the invention.

FIG. 2 shows the composition of an image scanning unit in the preferred embodiment according to the invention. In FIG. 2, the glass template 1, the full-speed scan reciprocating bed 2 equipped with the light source 3 and the mirror 4, half-speed scan reciprocating bed 7 equipped with the mirrors 5, 6, lens 8, photoelectric converting element (CCD) 9, wire rope 10, sheaves 11, drum 12, shaft 13, transmission gear system 14 and motor 15 are similar to those in the conventional unit in FIG. 1.

Further provided in this embodiment are a marking 16 with a length α in the main-scan direction disposed at one end of the mirror 4, and a control circuit 17 that detects an inclination of optical visual-line on the basis of the marking information to be image-formed on the photoelectric converting element 9 and controls the speed of the motor 15 to cancel a variation in magnification in the sub-scan direction according to the inclination.

Figure 3:
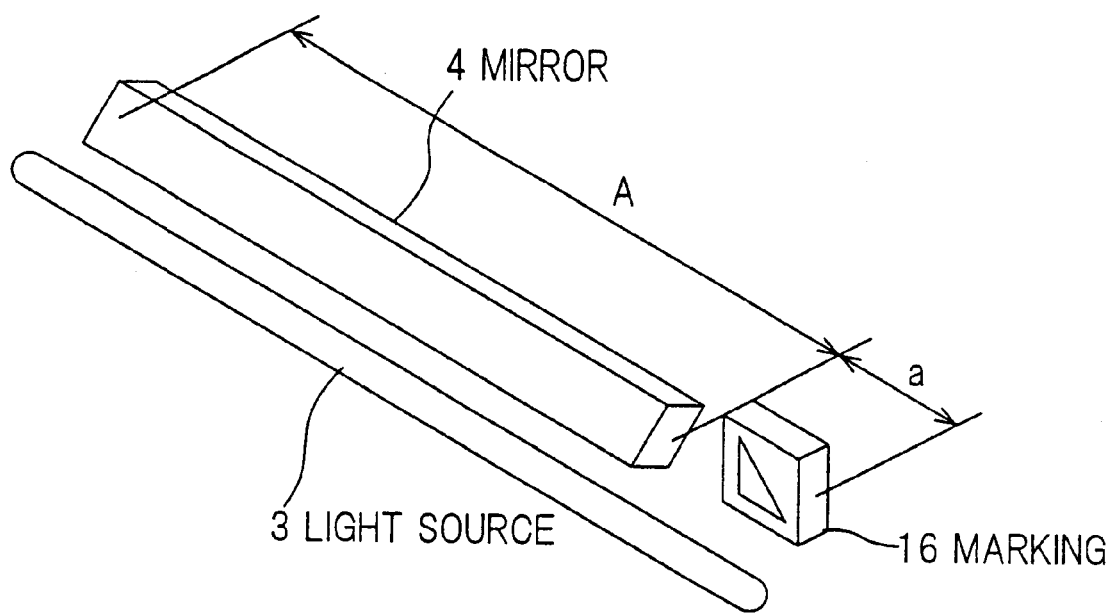
FIG. 3 is a perspective view showing an example of disposition of a marking 16.

FIG. 3 shows an example of disposition of the marking 16. In FIG. 3, given that the main-scan length of manuscript is A, the light source 3 is designed such that it can scan a (A+α) long object size. The length of the mirror 4 is A, and the marking 16 is disposed within the remaining length α.

Figure 4A:
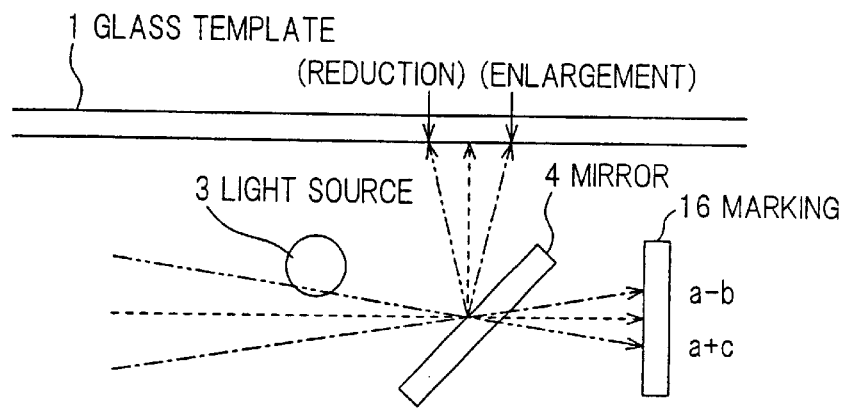
FIGS. 4A and 4B are illustration showing the relationships between the marking 16 and an inclination of optical visual-line.
Figure 4B:
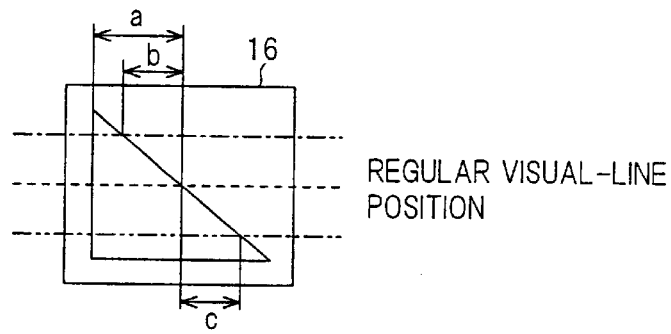
Figure 5:
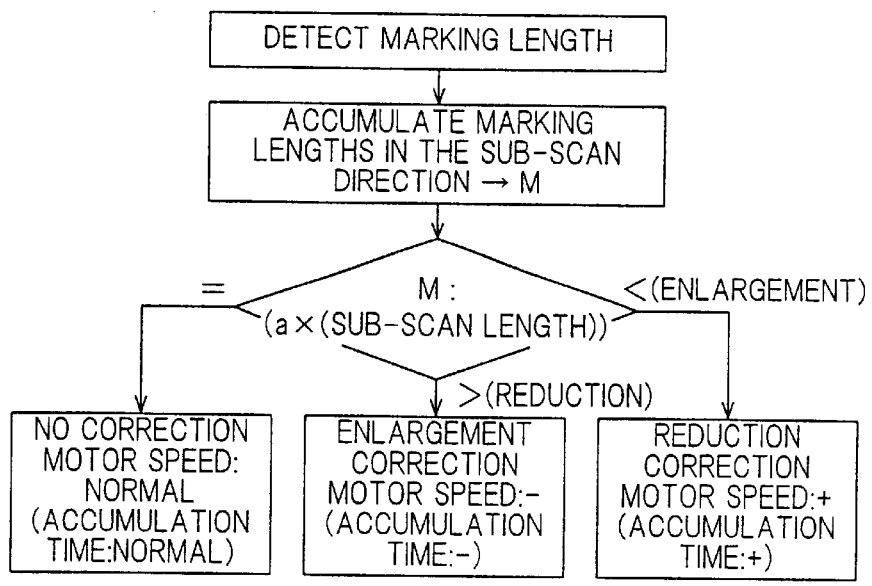
FIG. 5 is a flow chart showing an example of the control operation of a control circuit 17.

The operation of this embodiment is explained below, referring to FIGS. 2 and 3, FIGS. 4A and 4B that show the relationships between the marking 16 and inclination of optical visual-line, and FIG. 5 that shows an example of control operation in the control circuit 17.

The optical visual-line in scanning a manuscript in the sub-scan direction has equal reflection and incidence angles when reflected on the mirrors 4, 5 and 6. If the optical visual-line on the manuscript is inclined as shown by a one-dotted line or two-dotted line in FIG. 4A, the optical visual-line supplied to the mirror 4 is also inclined to the regular incidence angle. Therefore, if the incidence angle of optical visual-line to the mirror 4 can be detected, then the visual-line scan position on the manuscript can be found. The incidence angle of optical visual-line to the mirror 4 can be detected as below, using marking information to be image-formed on the photoelectric converting element 9.

When the light source 3 mounted on the full-speed scan reciprocating bed 2 supplies light to the marking 16 as well as the scan manuscript, the marking information is obtained as data corresponding to the length α in the main-scan direction of the photoelectric converting element 9. For example, when the marking 16 is such a triangle black marking as shown in FIG. 4B, at the regular visual-line, the black width of the marking 16 is detected as a. Also, when the optical visual-line occurs, the black width of the marking 16 is detected as (a−b) or (a+c).

The control circuit 17 receives the marking length thus detected, and stores that into the memory accumulating in the sub-scan direction. In the normal state that no inclination of optical visual-line occurs, a value M obtained accumulating the marking lengths is (a×sub-scan length). When the optical visual-line is inclined to the enlargement direction, the marking length is detected as (a−b), and a value M accumulated in the sub-scan direction is smaller than (a×sub-scan length). On the contrary, when the optical visual-line is inclined to the reduction direction, the marking length is detected as (a+c), and a value M accumulated in the sub-scan direction is greater than (a×sub-scan length). Accordingly, by comparing the accumulation value M with (a×sub-scan length), it can be determined which the optical visual-line is inclined to the enlargement direction or reduction direction.

According to the determination result, the control circuit 17 controls the speed of the motor 15 to cancel a variation in magnification in the sub-scan direction that is dependent on the inclination of optical visual-line. Namely, if M>(a× sub-scan length), where the optical visual-line is inclined to the enlargement direction (one-dotted line in FIG. 4A), then the reduction correction is conducted such that the motor 15 is quickened higher than the normal speed to give M=(a× sub-scan length). Also, if M>(a×sub-scan length), where the optical visual-line is inclined to the reduction direction (two-dotted line in FIG. 4A), then the enlargement correction is conducted such that the motor 15 is slowed lower than the normal speed to give M=(a×sub-scan length). Also, if M=(a×sub-scan length), where no inclination of optical visual-line occurs (broken line in FIG. 4A), then the motor 15 is kept as it has the normal speed.

Also, instead of controlling the rotation speed of the motor 15, the accumulation time of the photoelectric converting element 9 may be controlled. Namely, the accumulation time can be elongated when the optical visual-line is inclined to the enlargement direction, and the accumulation time can be shortened when the optical visual-line is inclined to the reduction direction.

Although, in the above embodiment, the example that the marking 16 is disposed within the length α on one end of the mirror 4 is shown, the marking may be disposed at both ends of the mirror 4 with dividing the length α into two parts. In this case, the magnification in the sub-scan direction may be corrected according to the average value inclinations of optical visual-line that are obtained from the two marking informations.

Also, other than the light source 3 for supplying light to the manuscript, a light source only for supplying light to the marking 16 may be provided on the full-speed scan reciprocating bed 2.

Advantages of the Invention

As described above, the image scanning unit of the invention can automatically correct a variation in magnification by detecting an inclination of optical visual-line between a manuscript and a photoelectric conversion element when a full-speed scan reciprocating bed and a half-speed scan reciprocating bed are scanned in the sub-scan direction, and by controlling the motor speed or accumulation time to cancel the variation in magnification in the sub-scan direction caused by the inclination.

Also, the image scanning unit of the invention is provided with a marking on the on the optical visual-line or the full-speed scan reciprocating bed and detects the inclination of optical visual-line using the marking information obtained by the photoelectric conversion element. Thus, the variation in magnification can be automatically corrected with such a simple composition. Therefore, the precision of magnification in the sub-scan direction can be enhanced.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An image scanning unit for correcting a variation in magnification caused by an inclination of optical visual-line between a manuscript and a photoelectric conversion element when a full-speed scan reciprocating bed and a half-speed scan reciprocating bed are scanned in the sub-scan direction, comprising:

an optical system that leads light reflected on the manuscript to said photoelectric conversion element;

a marking that is disposed on the optical visual-line of said full-speed scan reciprocating bed;

a light source that supplies light to said marking;

means for accumulating marking information that is input through said optical system to said photoelectric conversion element and detecting an inclination of optical visual-line by comparing said accumulated marking information and regular marking information at regular optical visual-line; and means for canceling the variation in magnification in the sub-scan direction caused by said inclination of optical visual-line detected by said accumulating and detecting means.

2. An image scanning unit, according to claim 1, wherein:

said canceling means controls the speed of a motor, which drives said full-speed scan reciprocating bed and said half-speed scan reciprocating bed, in such a direction that the variation in magnification in the sub-scan direction is canceled.

3. An image scanning unit, according to claim 1, wherein:

said canceling means controls the accumulation time of said photoelectric conversion element in such a direction that the variation in magnification in the sub-scan direction is canceled.

4. An image scanning unit, according to claim 1, wherein:

said light source supplies light to both the manuscript and the marking.

5. An image scanning unit, according to claim 1, further comprising:

a light source that supplies light only to the marking.

6. An image scanning unit, according to claim 1, wherein:

said marking is disposed at one end or both ends of a mirror that changes the optical path of reflected light in the main-scan direction of the manuscript.

* * * * *